Nov. 21, 1933.   H. B. SMITH ET AL   1,935,673
PIPE JOINT
Filed March 17, 1931
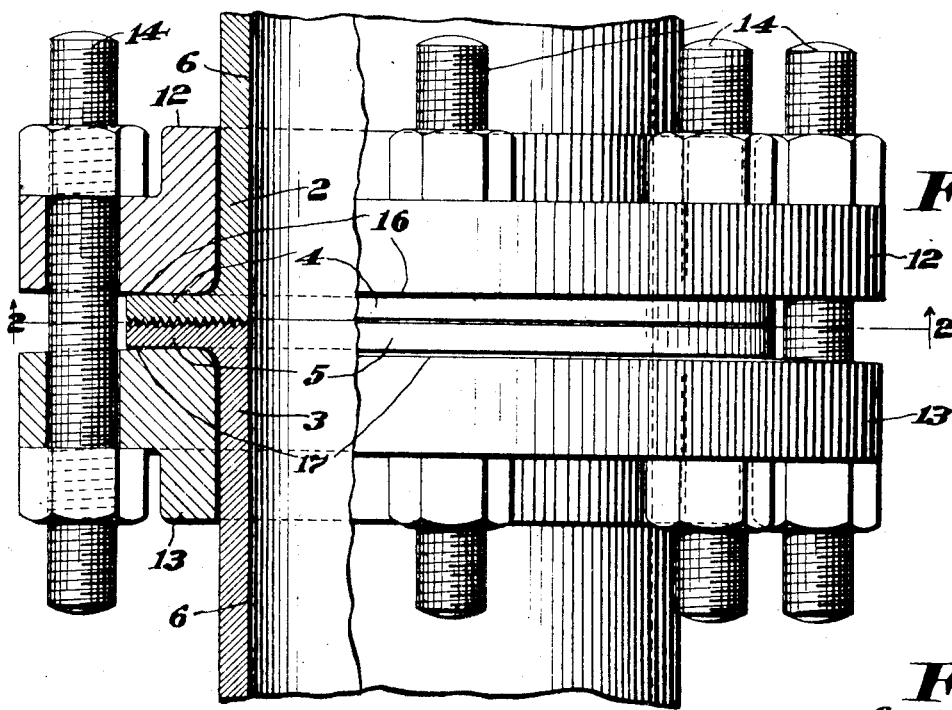
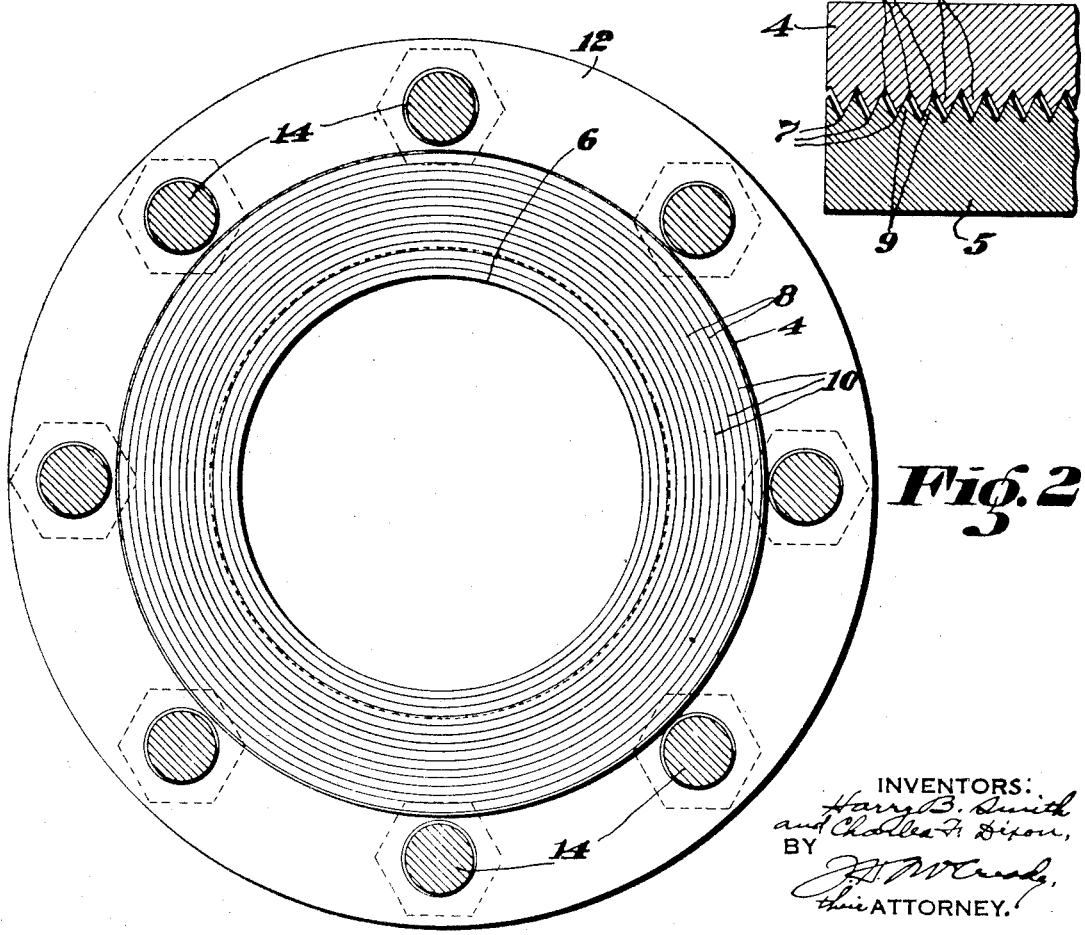
INVENTORS:
Harry B. Smith
and Charles H. Dixon,
BY
ATTORNEY.

Patented Nov. 21, 1933

1,935,673

UNITED STATES PATENT OFFICE 1,935,673

PIPE JOINT

Harry B. Smith, Upper Darby, and Charles F. Dixon, Wayne, Pa.

Application March 17, 1931. Serial No. 523,242

4 Claims. (Cl. 285—140)

This invention relates to pipe joints, and is more especially concerned with joints for pipe lines carrying high pressures.

It is a common practice to use flanged pipe joints in high pressure pipe lines. In such a joint a sheet of packing is placed between the abutting flanges and the flanges later are bolted together. The fact, however, that a packing must be used is a source of annoyance in making the original installation, and frequently is also a cause of trouble later, especially if the pipe line must carry exceptionally high pressures, since such pressures greatly increase the danger of blowing out the packings.

The present invention deals especially with these considerations, and it aims to devise a pipe joint which will successfully hold high pressures without the use of packings.

The nature of the invention will be readily understood from the following description when read in connection with the accompanying drawing, and the novel features will be particularly pointed out in the appended claims.

In the drawing,

Figure 1 is a view, partly in vertical section and partly in side elevation, of a pipe joint constructed in accordance with this invention;

Fig. 2 is a sectional view substantially on the line 2—2, Fig. 1, but showing the end face of one of the pipe members in elevation; and Fig. 3 is a sectional view showing, on a larger scale, the grooved construction of the meeting faces of the two pipe flanges.

The construction shown comprises two pipe end members 2 and 3, respectively, which may be integral with, or separate from, the adjoining pipe sections, as desired. These members are provided with radial flanges 4 and 5, respectively, having meeting or abutting faces surrounding the bore 6 of the pipe. So far as these features of the construction are concerned the joint is like those used heretofore. In the joint shown, however, the meeting surfaces of the flanges instead of being made plain or flat, as in the usual commercial constructions, are each provided with a series of concentric grooves. While the grooves may take a variety of forms, an arrangement like that shown in Fig. 3 has proved very satisfactory and consists simply of a series of 60° grooves separated by correspondingly shaped ribs or ridges. In Fig. 3 the bottoms of the grooves in the flange 5 are indicated at 7, while those in the opposite flange 4 are shown at 8. The ridges or ribs between adjacent grooves of the flange 5 are indicated at 9 and those in the flange 4 at 10. These grooves and ridges are formed circularly in each flange face about the axis of the pipe bore 6, and the ridges of one face are arranged to enter the grooves of the other but not to register with the grooves. In other words, the ridges of one face are offset radially with reference to the grooves of the other face by a distance less than the radial distance between the bottom of a groove and the crest or edge of the next adjacent ridge. Consequently, when the two grooved faces are brought together, the inclined surfaces of the ridges of one flange will strike the correspondingly inclined surfaces of the ridges of the other flange and thus prevent the ridges from bottoming in the grooves. This means that the inclined surfaces of the ridges between those surfaces which bear against each other will not be in contact with anything. In the particular arrangement shown in Fig. 3 all of the inclined surfaces of the ridges 9 which face toward the left are in contact with similar faces of the ridges 10, but those inclined surfaces of the ridges 9 which face toward the right are free from contact with any part of the flange 4. In other words, pressure will be exerted on one side only of each ridge, and the opposite side of each ridge will be free. As the nuts on the bolt 14 are tightened up and the pressure forcing the two flanges toward each other thus is increased, the contact of the two sets of ridges with each other will tend to bend the ridges laterally, or in a radial direction, due to the lateral wedging action which one ridge exerts on another. This will be clear from an inspection of Fig. 3. It will also be evident that this action is produced by the fact that the ridges in one flange are offset with reference both to the grooves and the ridges of the opposite flange. An exceptionally close contact between the annular inclined surfaces of corresponding ridges of both flanges thus is produced. Since the fluid conducted through the pipe must escape between these surfaces so pressed together, if any leakage at all is to occur, it will be evident that the difficulty of such escape is enormously increased and that leakage is definitely prevented.

In order to clamp the flanges 4 and 5 securely together, two clamping rings 12 and 13 encircle the end members 2 and 3 and bear against the outer surfaces of the respective flanges 4 and 5. These rings may be drawn together tightly by the bolts 14, thus forcing the meeting faces of the flanges 4 and 5 firmly into contact with each other. When this occurs an exceedingly close and intimate contact is produced between the inclined surfaces of the ridges 9 and 10 of the two flanges, as will be obvious from an inspection of Figs. 1 and 3. Due to this arrangement an exceptionally tight joint is produced without the use of a packing.

Instead of having the clamping rings 12 and 13 bear flatly against the flanges 4 and 5, we prefer to make the contact between the rings and the flanges such that a localized annular area of maximum initial pressure will be produced between the meeting faces of the flanges close to their inner margins, and this area will be widened radially as the pressure of the clamping rings on the flanges is increased. This may conveniently be accomplished by making the lower surface 16 of the ring 12 diverge or flare somewhat relatively to the upper flat face of the flange 4 and correspondingly shaping the upper surface 17 of the lower ring 13. The divergence of these faces from a plane perpendicular to the axis of the end members 2 and 3 need not be great in order to produce the results above described, an angle of 1½° or 2° being sufficient. With this arrangement as the bolts 14 are tightened up, the pressure comes first on those ridges 9 and 10 which are adjacent to the inner margins of the meeting surfaces of the flanges 4 and 5, and as the bolts are tightened further, the pressure travels outward radially, the rings 12 and 13 springing slightly until all the bolts have been set up to the desired degree.

This construction has been found in practice to be exceptionally satisfactory on pipe lines carrying very high pressures. The fact that packings have been entirely eliminated is an advantage both in assembling the line initially and also during operation since the danger of a packing blowing out is obviated. This construction is equally useful in valves, fittings, and the like, where essentially the same problems are presented as in pipe joints. The grooving of the flange faces may be performed rapidly in suitable machines by means of proper grooving tools.

While we have herein shown and described a preferred embodiment of our invention it will be understood that the invention may be embodied in other forms without departing from the spirit or scope thereof.

Having thus described our invention, what we desire to claim as new is:

1. A joint for pipes and the like, comprising two members having meeting faces, one of said members having an aperture therethrough and each face having a series of grooves to surround said aperture, said grooves being separated by ridges having inclined walls, the ridges of one of said faces being adapted to enter the grooves in the other face and being so offset with reference to the latter grooves as to cause each ridge of one face to bear against one side only of a corresponding ridge of the other face, and means for securing said members together with said grooved faces in said relationship.

2. A pipe joint comprising two pipe end members having radial flanges provided with meeting surfaces, said flanges surrounding the bores through said members, each of said meeting faces having a series of concentric grooves surrounding the bore therethrough, said grooves being separated from each other by ridges having inclined walls and the ridges of one face being adapted to enter the grooves in the other face but being offset radially with reference to the bottoms of the grooves in the latter face whereby each ridge of one face will bear on one side only of a similar ridge of the other face, two clamping rings surrounding said members and bearing, respectively, on said flanges, and bolts for drawing said clamping rings together to hold the meeting faces of said flanges firmly in contact with each other, the contacting surfaces of said flanges and said rings diverging slightly from each other as they extend away from the bores of said pipe end members.

3. A pipe joint comprising two pipe end members having radial flanges provided with meeting faces, two clamping rings surrounding said members and bearing, respectively, on said flanges, and means for drawing said rings toward each other and clamping said flanges together, said rings being shaped to cooperate with said flanges to produce a localized annular area of maximum initial pressure between said meeting faces, adjacent to and surrounding the pipe bore and to cause said area to widen outwardly as the pressure of said clamping rings on said flanges is increased.

4. A joint for pipes and the like, comprising two members having meeting faces, one of said members having an aperture therethrough and each of said faces having circular ridges surrounding said aperture, the adjacent ridges in each face being separated by grooves, said ridges in each face having inclined walls adapted to enter the grooves in the opposite face, said ridges in one face being offset radially by a substantial distance with reference to both the ridges and grooves in the opposite face, and means for securing said members together with said faces in contact with each other, whereby the offset relationship of said ridges will prevent the ridges of one face from bottoming in the grooves of the other face and will cause the inner inclined surfaces of the ridges in one face to bear against the outer inclined surfaces of the ridges in the opposite face with a tendency to bend both sets of ridges laterally as said faces are forced together.

HARRY B. SMITH.
CHARLES F. DIXON.